July 25, 1961
R. J. FAY
2,993,453
SANDWICHING MACHINE
Filed Dec. 15, 1958
8 Sheets-Sheet 1
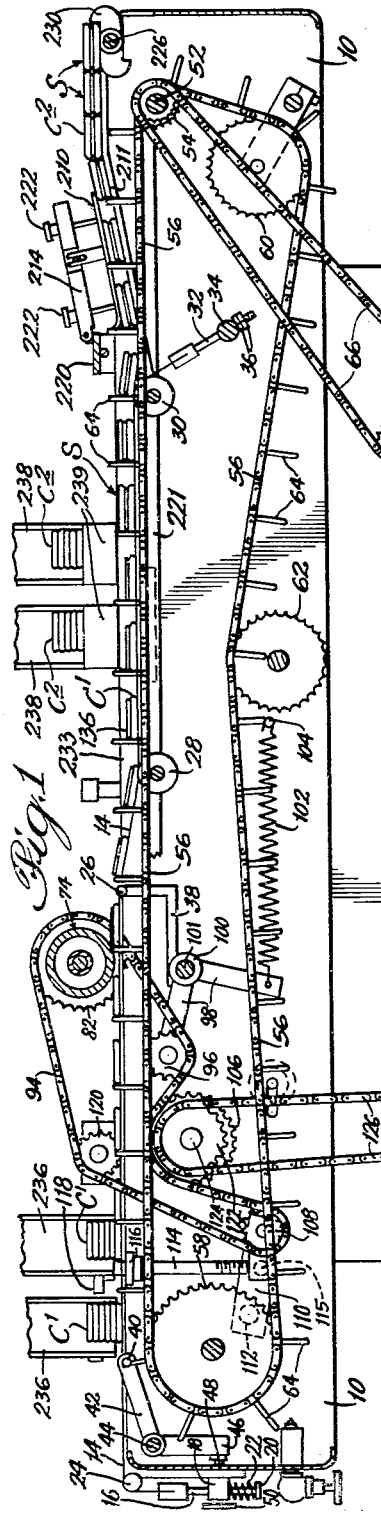
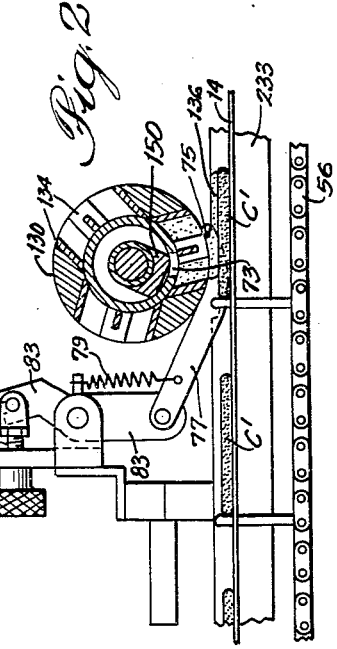
INVENTOR:
Rudolph J. Fay,
BY Bair, Freeman & Molinare
ATTORNEYS.

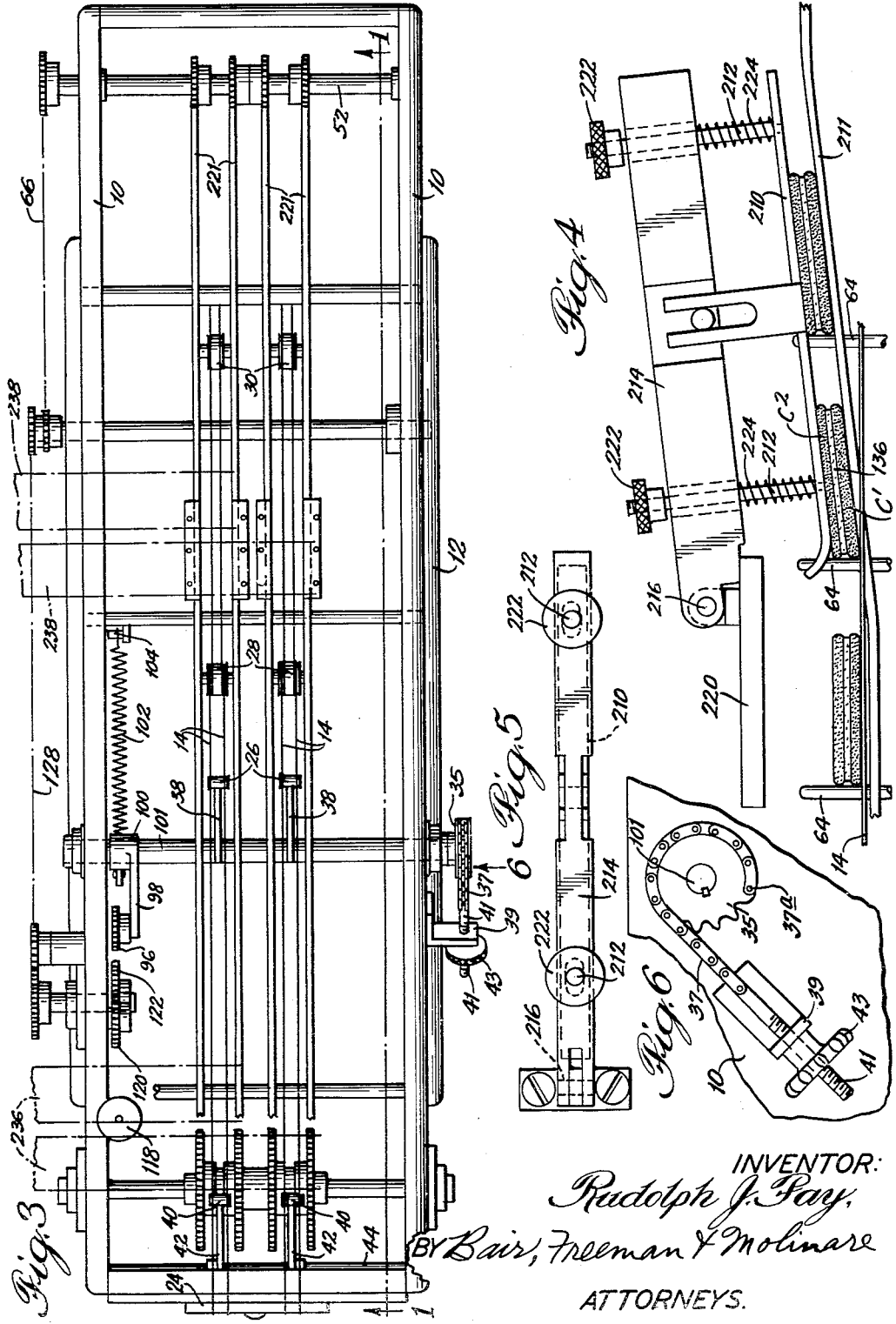

July 25, 1961  R. J. FAY  2,993,453
SANDWICHING MACHINE
Filed Dec. 15, 1958  8 Sheets-Sheet 3
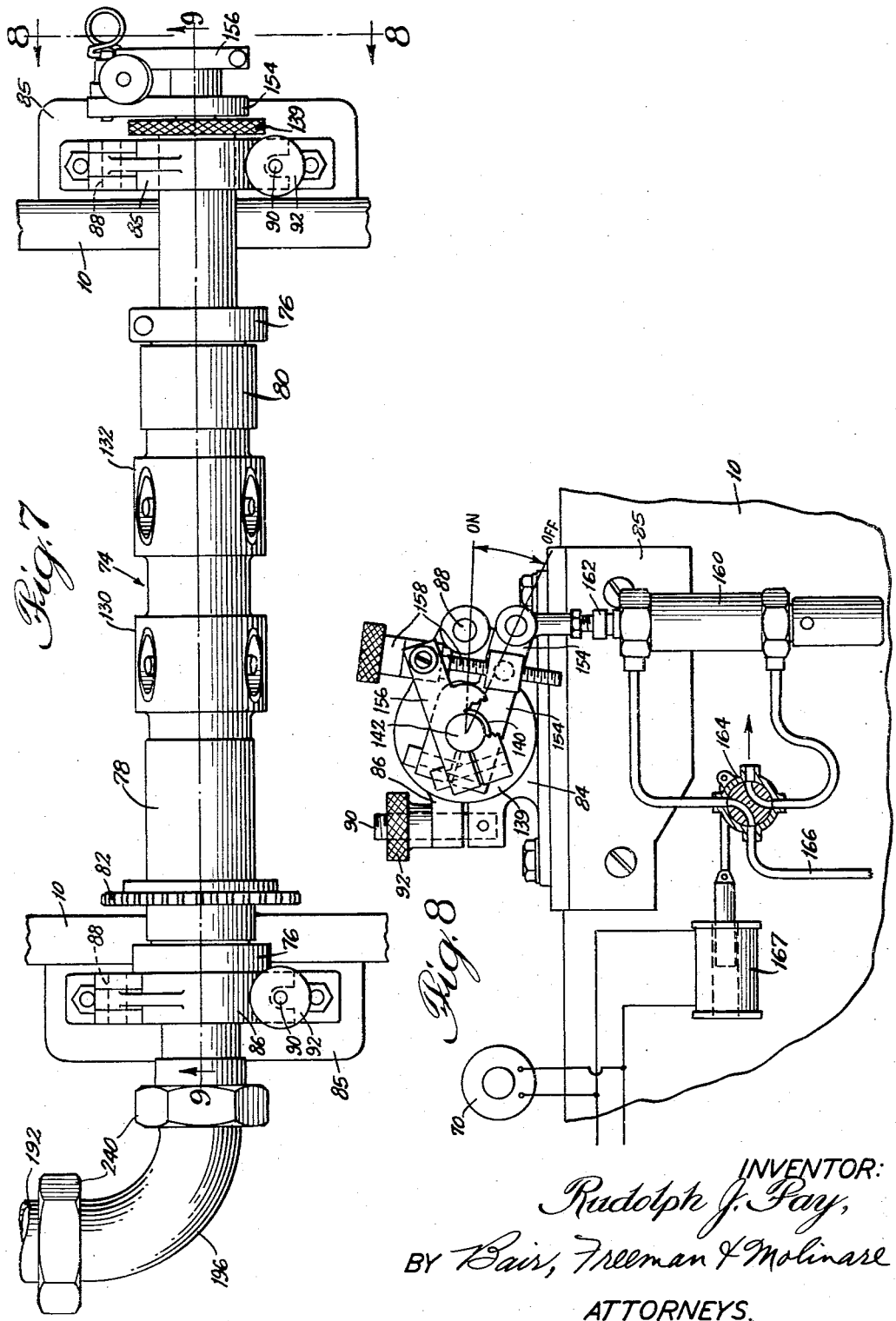
INVENTOR:
Rudolph J. Fay,
BY Bair, Freeman & Molinare
ATTORNEYS.

July 25, 1961  R. J. FAY  2,993,453
SANDWICHING MACHINE
Filed Dec. 15, 1958  8 Sheets-Sheet 4
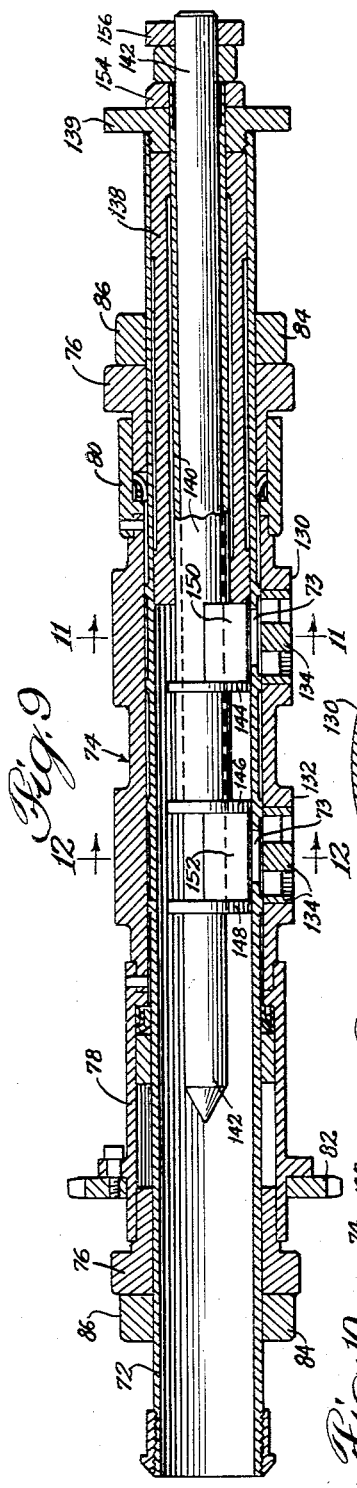
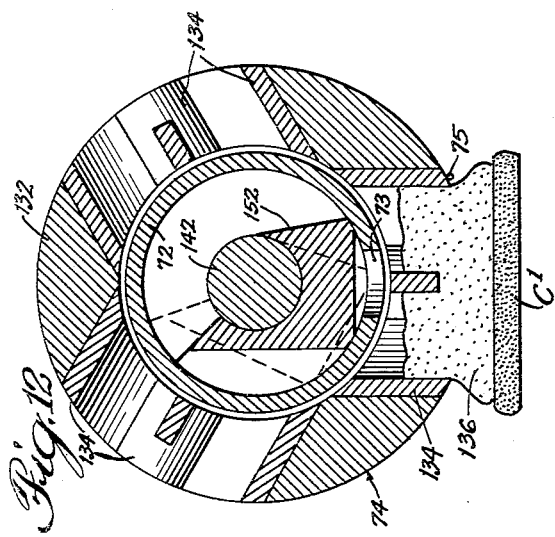
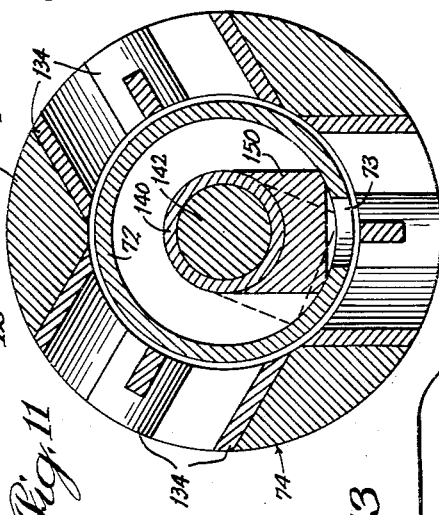
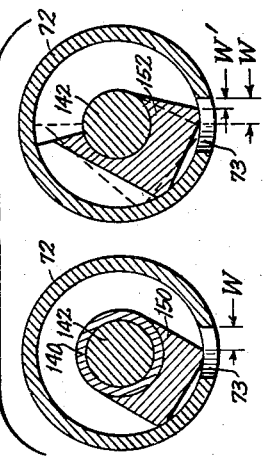
INVENTOR:
Rudolph J. Fay,
BY Bair, Freeman & Molinare
ATTORNEYS.

July 25, 1961  R. J. FAY  2,993,453
SANDWICHING MACHINE
Filed Dec. 15, 1958  8 Sheets-Sheet 5

INVENTOR:
Rudolph J. Fay,
BY Bair, Freeman & Molinare
ATTORNEYS.

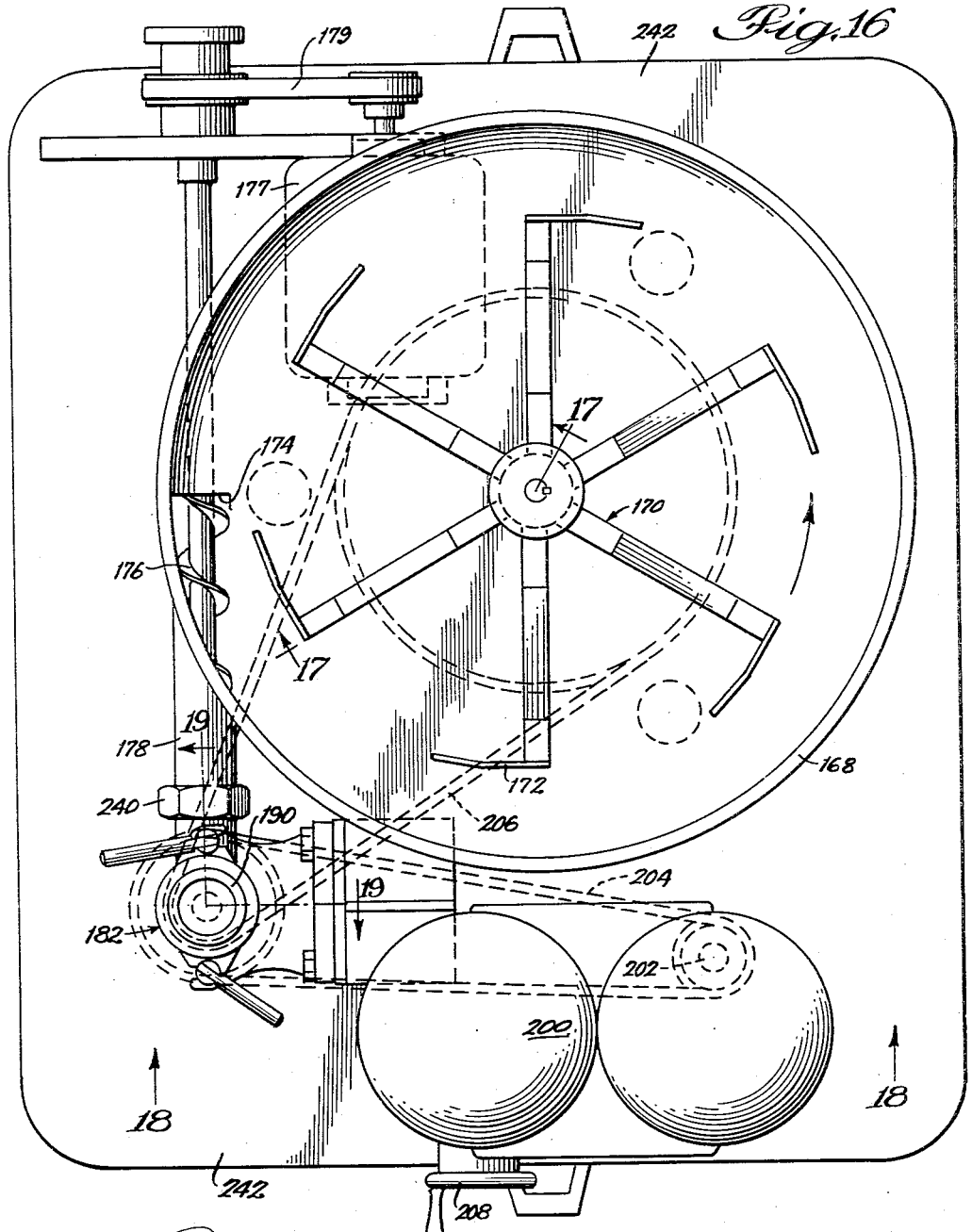
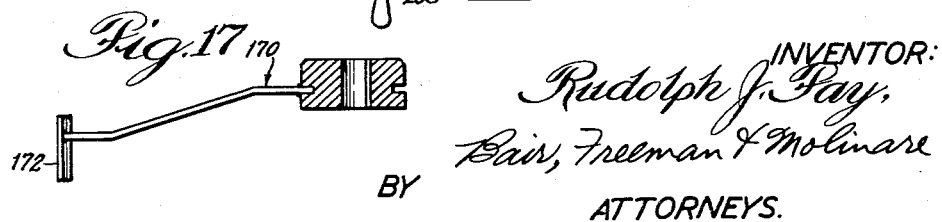

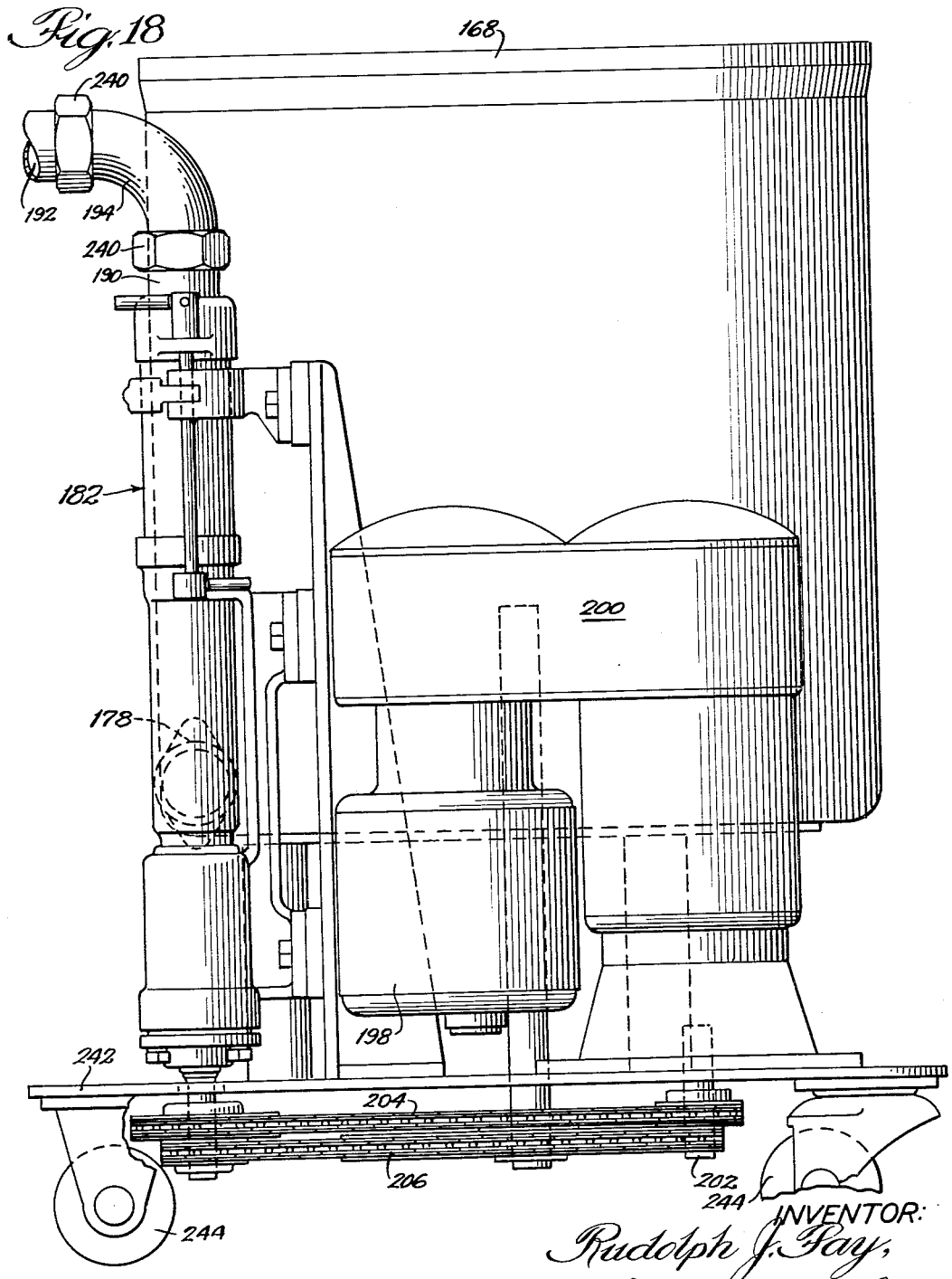

July 25, 1961
R. J. FAY
2,993,453
SANDWICHING MACHINE
Filed Dec. 15, 1958
8 Sheets-Sheet 8
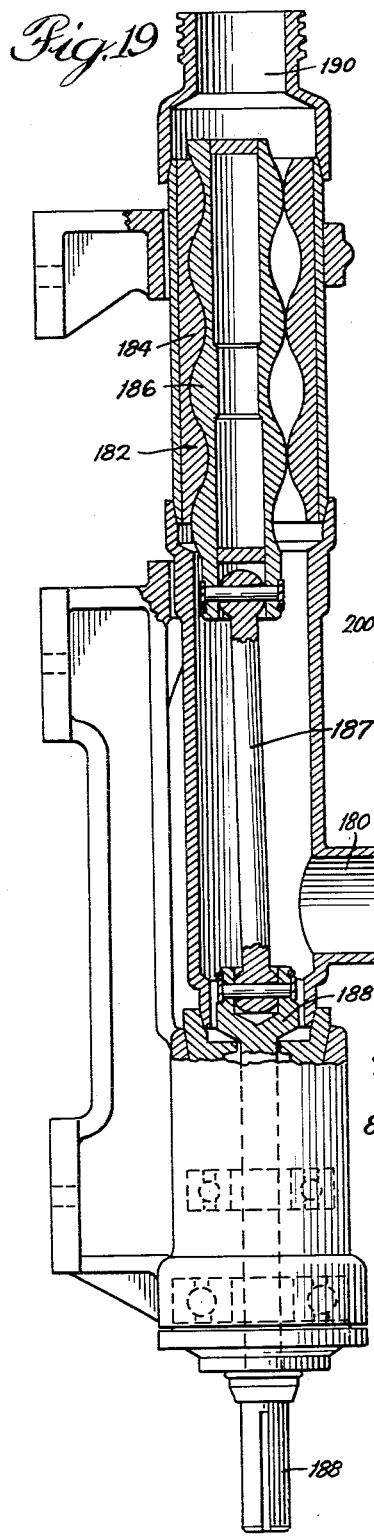
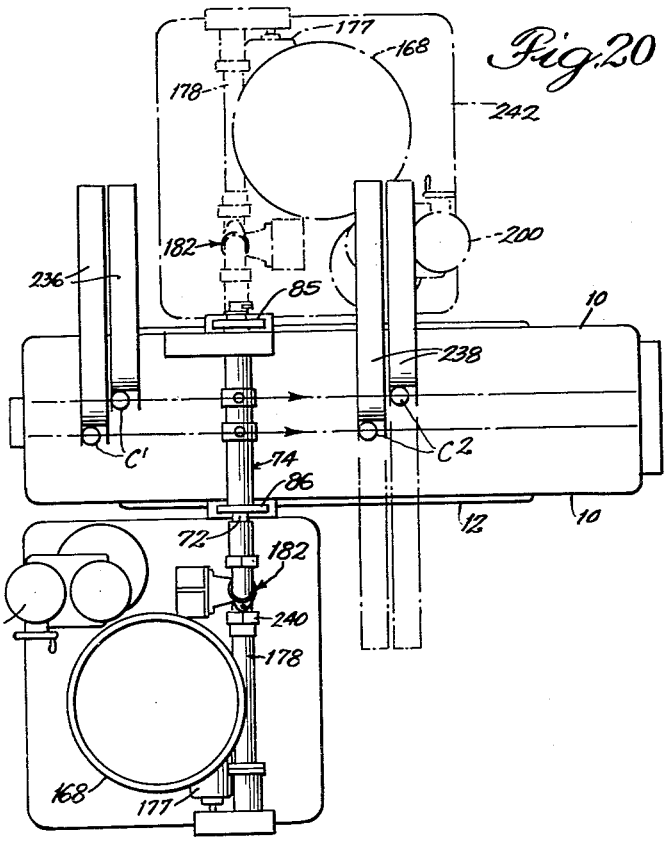
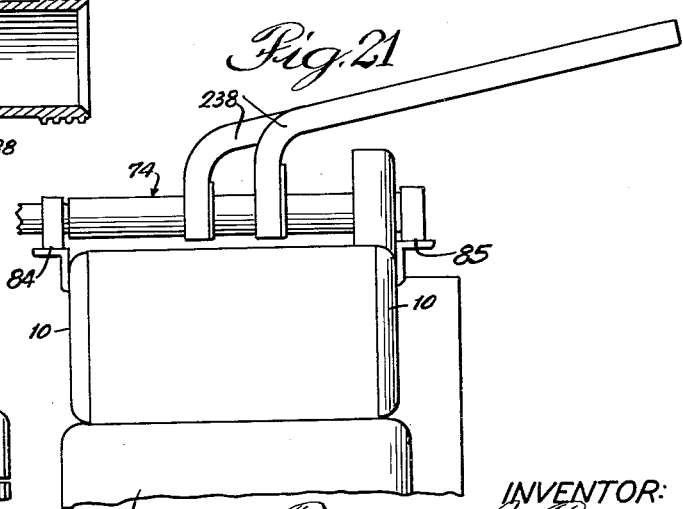
INVENTOR:
Rudolph J. Fay,
BY Bair, Freeman & Molinare
ATTORNEYS.

United States Patent Office 2,993,453
Patented July 25, 1961

2,993,453
SANDWICHING MACHINE
Rudolph J. Fay, Villa Park, Ill., assignor to Peters Machinery Company, Chicago, Ill., a corporation of Illinois
Filed Dec. 15, 1958, Ser. No. 780,508
16 Claims. (Cl. 107—1)

This invention relates to a sandwiching machine of simple, durable and inexpensive construction for assembling those types of "sandwiches" which comprise two cookies with a filler of creme between them, the machine having a conveyor for feeding cookies to a creme depositor which deposits a layer of creme thereon, whereupon another cookie is deposited on top of the layer of creme and the sandwiches thus assembled are delivered to a stacker.

One object of the invention is to provide a sandwiching machine in which the cookies are supported by a taut wire arrangement and fingers of a conveyor chain slide the cookies along the wires, the tension of the wires being adjustable, and means being also provided for adjusting the height thereof to accommodate different thicknesses of cookies that are sandwiched in the machine.

Another object is to provide a depressor for the completed sandwiches which is readily movable to an elevated position for permitting the removal of any sandwiches which jam in the machine.

Still another object is to provide a stencil so constructed that it can be readily taken apart for cleaning and also a hopper that receives the creme, a novel pump arrangement being provided for removing the creme from the hopper and feeding it to the stencil.

A further object is to provide automatic shut-off means incorporated in the stencil assembly so that the discharge openings thereof may be closed whenever the machine stops to avoid undesirable seepage of creme from the depositor.

Still a further object is to provide a novel differential adjusting arrangement for the rotation of the stencil relative to the fingers of the conveyor that deliver cookies to the stencil so that proper registry or centering of the stencil opening relative to the base cookies on which the creme is deposited by the stencil assembly is had, and the parts being so designed that adjustment is possible while the machine is in operation and enabling the proper regulation in relation to the depositor to correct for a too-early or too-late deposit offcenter of the creme on the base cookie.

An additional object is to provide a novel stencil assembly to which the creme is pumped, the stencil being so constructed as to have inserts of different shapes as required and being adjustable as to discharge opening size so that the flow of creme is properly balanced between a pair of openings.

Another additional object is to provide a sandwiching machine having a novel creme depositor including an auger feed from a creme hopper which is provided with a paddle that tends to move the creme toward the outlet of the hopper and into the inlet of the auger, the parts being readily taken apart for ease of cleaning which is so necessary in machines of this character.

Still another additional object is to provide the auger discharging into a "Moyno" positive displacement pump that forces the creme through a conduit to the creme depositor itself.

A further additional object is to provide a depositor having a drum and cutoff wire arrangement for depositing sandwich creme or related material on base cakes of any desired shape at high speeds and without the use of pistons, the high speed feature being attained because there is no intermittent or reciprocating motion in the apparatus and all elements thereof rotate at a constant rate of speed.

Still a further additional object is to provide a depositor comprising a stationary sleeve around which a drum is rotatable, and a proportioning valve arrangement is provided to equalize the flow of the creme to the stencils when there is more than a single row of sandwiches being formed in the machine.

Another additional object is to provide a novel stacker for the sandwiches after they are formed and comprising a rotary cam arrangement to first upright the sandwiches and then feed them face-to-face and on edge along a platform to a take-out conveyor.

A final object is to provide the foregoing elements of such design that they permit the forming of sandwiches at a relatively high rate such as 600 to 1,000 per minute in a double-row machine without undue breakage of the sandwiches.

With these and other objects in view, my invention consists in the construction, arrangement and combination of the various parts of my sandwiching machine, whereby the objects above contemplated are attained, as hereinafter more fully set forth, pointed out in my claims and illustrated in detail on the accompanying drawings, wherein:

FIG. 1 is a vertical sectional view of my sandwiching machine and shows the driving mechanism for various parts of the machine;

FIG. 2 is an enlarged vertical sectional view of a portion of FIG. 1 taken through a depositor assembly and shows a cutoff wire coacting therewith;

FIG. 3 is a plan view, mainly of the frame and cookie conveyor assembly of my machine to show the relation of parts;

FIG. 4 is an enlarged side elevation showing a depressor;

FIG. 5 is a plan view of FIG. 4;

FIG. 6 is an enlarged side elevation of a portion of FIG. 3 adjacent the indicating arrow 6;

FIG. 7 is an enlarged plan view of my novel creme depositor;

FIG. 8 is an end elevation thereof on the indicated line 8—8 of FIG. 7 showing pneumatic means for operating a stencil cutoff valve;

FIG. 9 is a sectional view through the depositor of FIG. 7 as taken on the line 9—9 thereof;

FIG. 10 is a bottom plan view of one of the lands of the depositor;

FIG. 11 is an enlarged vertical sectional view through the depositor on the line 11—11 of FIG. 9;

FIG. 12 is a similar view on the line 12—12 of FIG. 9.

FIG. 13 is a slightly reduced cross section similar to portions of FIGS. 11 and 12 to show a proportioning valve adjusting relationship;

FIG. 16 is a plan view of a creme hopper and pump assembly;

FIG. 17 is a sectional view on the line 17—17 of FIG. 16 showing a paddle for the hopper;

FIG. 18 is an elevation of the hopper and pump assembly of FIG. 16 looking in the direction of the arrows 18 thereon;

FIG. 19 is an enlarged sectional view on the line 19—19 of FIG. 16 showing the "Moyno" pumps; and FIG. 20 is a diagrammatic plan view of my sandwiching machine and the hopper and pump assembly for supplying creme thereto; and FIG. 21 is a diagrammatic intake end view thereof.

Figure 14:
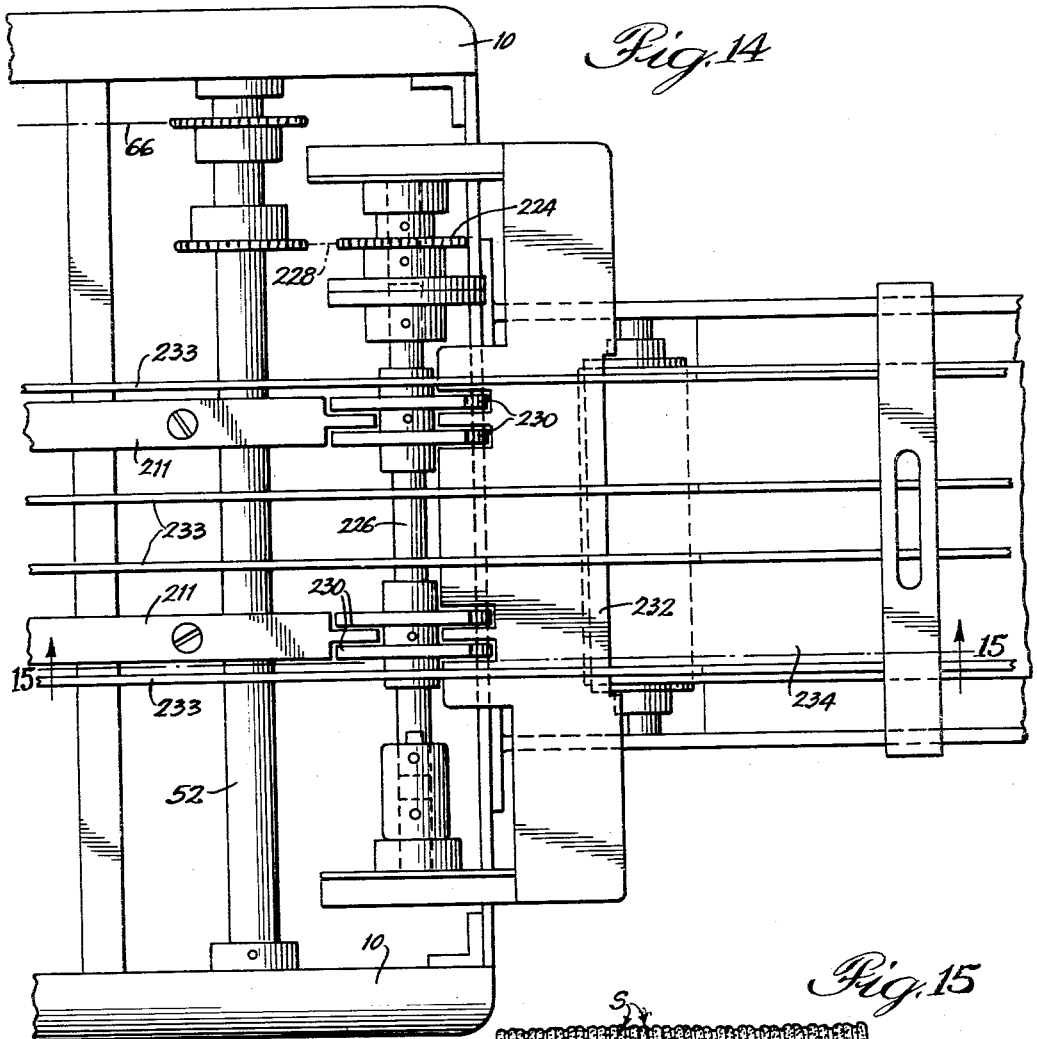
FIG. 14 is an enlarged plan view of the discharge end of the sandwiching machine (the right-hand end in FIG. 2) and shows a novel stacker.

On the accompanying drawings I have used the reference numeral 10 to indicate side frames of my machine and 12 the base for the side frames 10.

A pair of supporting wires 14 is provided for each row of sandwiches to be formed in the machine (two rows being shown) and the left-hand end of each wire is secured to a stem 16 slidable through a bracket 18 and having a head 20 thereon between which and the bracket a spring 22 is interposed. The wires extend upwardly from the stems 16 and bend over a rod 24 to extend toward the right, then lie in grooves of stub rods 40 and 26, then wrap one turn around grooved pulleys 28, then extend over grooved pulleys 30 and their right-hand ends are secured to threaded stems 32. The stems 32 are slidable through a cross rod 34 and lock nuts 36 are provided for adjusting the tension of the wires.

The stub rods 26 are supported on arms 38 and the other stub rods 40 are supported on arms 42. The arms 38 are welded to the rock shaft 101 on which is a sprocket 35 (FIGS. 3 and 6). A chain 37 has one end secured at 37ᵃ to the sprocket 35, extends over the sprocket and has its other end secured to a pull screw 41 slidable through a bracket 39 mounted on one of the side frames 10. A handwheel 43 is threaded on the pull screw 41 for elevating the stub rods 26 thereby adjusting the height of the supporting wires 14 at this point.

The arms 42 are pivoted on a cross rod 44 and a second arm 46 for each arm 42 constitutes therewith a bell crank. These bell cranks are adjusted about the cross rod 44 as a pivot by a set screw 48 having a handwheel 50 thereon for turning the set screw.

A conveyor drive shaft 52 is provided on which are conveyor drive sprockets 54, and conveyor chains 56 extend around these sprockets and also around sprockets 58 and idler sprockets 60 and 62, all as shown in FIG. 1. The conveyor chains 56 are provided with pin-like fingers 64 for propelling cookies and sandwiches along the taut supporting wires 14 as will hereinafter appear. Chain supporting rails 221 are provided for the chains 56 and side rails 233 for the cookies and sandwiches are provided throughout the length of the machine.

The conveyor drive shaft 52 is driven by a pair of drive chains 66 and 68 and suitable sprockets for reducing the speed in an obvious manner, the chain 68 being driven by an electric motor or the like 70 or other prime mover for actuating my sandwiching machine.

Describing now the depositor shown in FIGS. 7 to 13 inclusive, a tubular shaft 72 having a pair of stencil ports 73 is provided around which a depositor drum 74 rotates. The shaft 72 is provided with bearings 76 (see FIG. 9) and the depositor drum 74 is provided with extension sleeves 78 and 80 secured thereto and rotatable on the bearings 76. The extension sleeve 78 is provided with a depositor drive sprocket 82.

The shaft 72 is removably supported with respect to the side frames 10 by pillow blocks 84 mounted on brackets 85 secured to the side frames. Pillow block caps 86 are pivoted at 88 to the pillow blocks 84, and clamp bolts 90 are provided with clamp nuts 92 for clamping the pillow block caps against the top of the shaft 72 to hold it firmly seated in and against rotation relative to the pillow blocks 84.

For driving the depositor drive sprocket 82, I provide a depositor drive chain 94 as shown in FIG. 1 which passes under an idler sprocket 96 carried by a bell crank 98 secured to a rock sleeve 100 rotatable on the rock shaft 101. One end of a spring 102 is connected to the bell crank 98, and the other end thereof is anchored to a stationary stud 104 so as to tend to move the idler sprocket 96 downwardly for keeping the chain 94 taut. The chain 94 also passes around a drive sprocket 106, and a pair of idler sprockets 108 and 120. The idler sprocket 108 is carried by an arm 110 pivoted at 112 and a differential adjusting screw 114 is threaded into a block which is pivoted at 115 to the arm. A bracket 116 is provided through which the differential adjusting screw 114 rotatably and non-slidably extends, and the upper end of the screw is provided with a handwheel 118 for adjusting the same for a purpose which will hereinafter appear.

For driving the sprocket 106 from the motor 70, a sprocket 122 is mounted on a shaft 124 on which the sprocket 106 is also mounted, and the sprocket 122 is driven by a pair of chains 126 and 128 in an obvious manner. Thus the depositor drum 74 is driven cyclically with respect to the conveyor chain 56.

The depositor further includes a pair of drum-like lands 130 and 132 in which are interchangeable stencils 134 of any desired shape, three of them being provided around the periphery of each land, and the timing is such that the depositor rotates once each three base cookies passing thereunder. The base cookies are shown at $C^1$ in FIG. 12 for the deposit of creme 136 thereon.

A stencil shaft plug 138 (see FIG. 9) extends into the tubular shaft 72 and is retained therein by a lock nut 139. A shutoff valve tube 140 is rotatable therein and a shutoff valve rod 142 is rotatable in the valve tube 140. The tube 140 has a flange 144 thereon and terminates adjacent a second flange 146 secured to the rod 142. A third flange 148 is also secured to the rod 142.

To the right of the flange 144 I provide a valve block 150 (see FIG. 11) welded to the tube 140, and between the flanges 146 and 148 I provide a second valve block 152 (see FIG. 12) welded to the rod 142. These valve blocks are adjustable in relation to each other by means of levers 154 and 156 (FIG. 8) secured to the tube 140 and the rod 142 respectively, and the levers are angularly adjustable relative to each other by means of an adjusting screw 158.

Both valve blocks are also simultaneously adjustable to and from a cutoff position by the operation of a double-acting pneumatic cylinder 160 from which a piston rod 162 projects, the rod being pivoted to the lever 154. Shown diagrammatically in FIG. 8 is a control valve 164 for the cylinder supplied from a compressed air line 166 and actuated by a solenoid 167 shunting the circuit of the motor 70 so that whenever the motor is de-energized as illustrated the valve blocks 152 and 150 will move to the shutoff position shown solid in FIGS. 11 and 12, and will move to the open (dotted) positions thereof when the motor 70 and the solenoid 168 are energized.

The depositor drum 74 is supplied with creme from a creme hopper 168 shown in FIGS. 16, 18 and 20 having a paddle 170 therein for gently stirring the creme. The paddle is provided with blades 172 that act to propel the creme radially outward toward a discharge opening 174 in the bottom of the hopper 168. An auger-type conveyor 176 is mounted in a tubular casing 178 and this discharges into the inlet 180 of a feed pump 182 sold commercially under the name "Moyno." The positive displacement construction of this pump is more particularly disclosed in Patents Nos. 2,085,115; 2,028,407; and 2,512,764. As illustrated in FIG. 19, the pump 182 includes a fixed casing 184 having a double helical bore therethrough, and a helical rotor 186 of circular cross section is mounted in the casing 184 for rotation and for lateral shifting movement. I have found that a pump of this type will force the creme into my depositor under a positive pressure and without unduly "working" the creme.

The rotor 186 is driven by a universal joint connection 187 from a drive shaft 188. The outlet of the "Moyno" pump 182 is shown at 190 and is connected by a suitable conduit 192 and elbows 194 to the left-hand end of the tubular shaft 72 as shown in FIG. 7. The inlet 180 and outlet 190 are readily disconnectible with respect to the auger housing 178 and the conduit 192 respectively, and also relative to the tubular shaft 72, conduit 192 and elbows 194 and 196 by five coupler nuts 240 as shown in FIGS. 7, 16, 18 and 20 for ease of cleaning, while the clamp type pillow blocks 84—86 provide for ready removal of the entire depositor drum assembly for cleaning purposes. The pillow blocks can also be quickly opened for removing the depositor assembly for replacement by a different drum such as one having a modified form of stencil compared to that shown in FIG. 10 at 134 and/or for connecting a full hopper 168 to the machine to replace one that has been emptied, thus minimizing the down time for the machine and securing maximum production. Also, the design is such that the drum 74 can be reversed end-for-end in case the creme pump assembly shown in FIG. 20 has more room for its location on the left side (broken lines) of the machine than the right side, the pump assembly being portable by reason of the parts thereof mounted on a platform 242 castered at 244 as shown in FIG. 18.

Referring to FIG. 2 a cutoff wire 75 is disclosed supported by arms 77 and held against the periphery of the depositor drum 74 by a spring 79. The arms 77 are supported on arms 83 pivoted to a stationary bracket and provided with an adjusting screw 81 to determine the position of the wire 75 relative to the stencil 134. Such relation is shown in FIG. 12.

For driving the paddle 170 and the rotor 186 of the "Moyno" pump 182, I provide a motor 198 (see FIG. 16), a variable speed drive 200 such as a "Reeves" drive terminating in a shaft 202, and chains 204 and 206, together with suitable sprockets as obvious from an inspection of FIGS. 16 and 18. These chains and sprockets are shown in dotted lines in FIG. 16. The rate of feed of creme from the pump 182 may be nicely regulated by the adjusting handwheel 208 of the drive 200. For driving the conveyor 176 a motor 177 and a belt 179 are provided.

Located adjacent the right-hand end of the machine as illustrated in FIG. 1 are hold-down bars 210. These are mounted on rods 212 that are slidable in brackets 214 pivoted at 216 to a stationary bracket 220 (FIG. 4). The rods 212 are threaded for adjusting nuts 222 and springs 224 are interposed between the brackets 214 and the hold-down bars 210.

Figure 15:
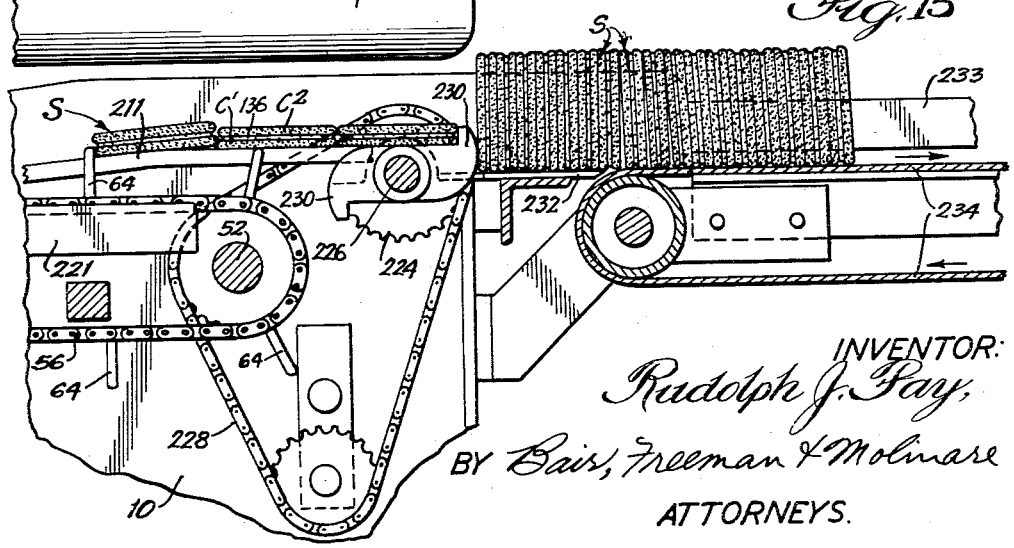
FIG. 15 is a vertical sectional view on the line 15—15 of FIG. 14 to show the stacker.

Proceeding to the right-hand end of the machine in FIG. 1, a stacker shaft 226 is illustrated (details of which are shown in FIGS. 14 and 15) driven by a chain 228 from the conveyor drive shaft 52. Stacker cams 230 are secured to the stacker shaft 226 and deliver the completed sandwiches (designated S) to a platform 232 from which the sandwiches are taken away by a take-out conveyor belt 234.

Base cookie magazines of trough-like character 236 (FIGS. 1, 20 and 21) are provided for delivering base cookies $C^1$ to the sandwiching machine at one point, and secondary or top cookie magazines 238 are provided for delivering the top cookies $C^2$ to the base cookies after the creme has been deposited thereon. The base cookies are removed one at a time from the magazines 236 by the conveyor fingers 64, while suitable escapement mechanisms 239 may be provided for the magazines 238 to drop the cookies $C^2$ on each cookie $C^1$ and its deposit of creme 136.

*Practical operation*

When my machine is in operation the magazines 236 will deliver base cookies $C^1$ to the supporting wires 14 and the fingers 64 will propel the base cookies along the wires, first to the depositor 74, then to the magazines 238 which deposit the top cookies $C^2$ on the base cookie and the creme 136, whereupon the pins 64 slide the sandwiches along the wires 14 and then along inclined rails 211 (FIGS. 1, 14 and 15) under the depressor bars 210 until the sandwiches overlie the cams 230 as shown in FIG. 15.

The height of the wires 14 under the magazines 236 and the depositor drum 74 may be nicely adjusted by raising and lowering the stub rods 40 and 26 respectively by manipulating the adjustment handwheels 50 and 43 respectively, the tension on the wires being substantially constant during adjustment by reason of the springs 22. This tension, however, can be adjused by manipulating the lock nuts 36 on the stems 32 if desired.

The creme 136 fed to the tubular shaft 72 flows past the open valve blocks 150 and 152 and through stencil ports 73 of the shaft 72, then through the stencils 134 as shown in FIG. 12 to be deposited on the base cookie $C^1$. The valve blocks 150 and 152 of course are now in the dotted or open positions (which open positions are illustrated in FIG. 13) by reason of the motor 70 of the sandwiching machine being energized and the solenoid 168 likewise energized so that the valve blocks have been moved from the "Off" to the "On" position indicated for the shutoff valve in FIG. 8.

The valving arrangement in the depositor is such that when the machine stops it is automatically moved to the closed position as an open stencil port 73 would permit undesirable leakage of creme if the valve were not closed.

Since the land 130 is farther from the intake end of the tubular shaft 72 than is the land 132, in order to equalize the flow of creme 136 the valve block 152 should be adjusted to a position of less opening than the valve block 150. This is illustrated in FIG. 13 and is accomplished by adjusting the screw 158 (FIG. 8) so that the valve block 152 as shown in FIG. 13 (right) is at the solid line position rather than the dotted line position (which dotted position would produce the same width W of opening for 152 as for 150) and results in less width W' determined by the valve block 152 in relation to the stencil port 73 as compared to the width W of the stencil port 73 for the valve block 150 (FIG. 13—left). Thus by manipulating the adjusting screw 158 a very nice balance of creme flow from the two stencil lands 130 and 132 is possible. The proportioning valve adjustment just described can also be accomplished while the machine is in operation.

As the depositor drum 74 rotates counterclockwise in FIG. 11, the cutoff wire 75 cuts off the creme for each stencil as it passes the wire, thus leaving a clearly defined deposit of creme 136 on the base cookie $C^1$.

The base cookies $C^1$ and their deposits of creme 136 are propelled by the fingers 64 along the wires 14 over the stub rods 26 and the pulleys 28 to the magazines 238 which deposit the topping cookie $C^2$ thereon. In the event the deposit of creme is not properly centered on the base cookie $C^1$, the differential adjusting wheel 118 can be manipulated while the machine is in operation for shifting the portion of the chain assembly 94 extending over the sprocket 82 to rotate it in either required direction with respect to the sprocket 106, tension being maintained by the spring 102, and thus the adjustment is accomplished by a very simple differential type of mechanism. The fingers 64 then propel the completed sandwiches along the wires 14 and then up the inclined rails 211 as they pass under the depressor bars 210 which are adjusted so as to provide slight spring pressure to depress the sandwiches S to a proper thickness, and hold them in position as they are propelled by the fingers 64. In case of any malfunctioning the depressor brackets 214 for the depressor bars 210 may be swung upwardly about their pivots 216 to permit removal of broken sandwiches.

Finally the fingers 64 propel the sandwiches into a position on top of the cams 230 as shown in FIG. 15 and as the cams rotate clockwise they upright the sandwiches and push them face-to-face along the platform 232 until they rest on the conveyor belt 234 and the belt then moves them out of the machine. Manual or automatic means may be provided for removing the sandwiches from the belt 234 and placing them in boxes or other containers.

Some changes may be made in the construction and arrangement of the parts of my sandwiching machine without departing from the real spirit and purpose of my invention, and it is my intention to cover by my claims any modified forms of structure or use of mechanical equivalents which may reasonably be included within their scope.

I claim as my invention:

1. In a sandwiching machine of the character disclosed, a frame, means for conveying two rows of cookies or the like along said frame, a depositor for depositing creme or the like on said cookies, said depositor comprising a depositor drum having two discharge openings, one for each row of cookies, removable stencils for said openings, means for rotating said drum cyclically in respect to the cookies supplied by said conveying means, combination shutoff and adjustable valve blocks in said depositor drum movable to shut off or open positions for both of said discharge openings, and relatively adjustable for opening one discharge opening more than the other, means operable upon operation of the sandwiching machine to open said shutoff valve and close it when the machine stops operating, and a creme hopper and pump means for supplying creme to said depositor.

2. In a sandwiching machine, a frame, means for conveying two rows of cookies or the like along said frame, a depositor for depositing creme or the like on said cookies, said depositor comprising a depositor drum having two discharge openings, one for each row of cookies, means for rotating said drum cyclically in respect to the cookies supplied by said conveying means, a differential adjustment between said depositor drum and said conveying means including sprockets and a chain, idlers for said chain, one of which is spring-controlled and the other of which is manually adjustable for shifting said chain relative to said conveying means and thereby changing the relative position of said conveying means and said depositor drum for centering the creme deposits on the cookies, combination shutoff and adjustable valve blocks in said depositor drum movable to shutoff and open positions for both discharge openings, and movable for adjusting the opening of one discharge opening relative to the other, means operable upon operation of the sandwiching machine to open said shutoff valve and close it when the machine stops operating, and a creme hopper and pump means for supplying creme to said depositor.

3. In a sandwiching machine of the character disclosed, a frame, means for conveying two rows of cookies or the like along said frame, a depositor for depositing creme or the like on said cookies, said depositor comprising a depositor drum having two discharge openings, one for each row of cookies, means for rotating said drum cyclically in respect to the cookies supplied by said conveying means, a differential adjustment between said depositor drum and said conoveying means including sprockets and a chain, idlers for said chain, one of which is spring-controlled and the other of which is manually adjustable for shifting said chain relative to said conveying means and thereby changing the relative position of said conveying means and said depositor drum for centering the creme deposit on each cookie, adjustable valve blocks in said depositor drum movable for adjusting the opening of one discharge opening relative to the other, and a creme hopper and pump means for supplying creme to said depositor.

4. A sandwiching machine comprising a frame, means for conveying cookies or the like along said frame, a depositor for depositing creme or the like on said cookies, a creme hopper and pump means for supplying creme to said depositor, said hopper having a paddle therein for urging the creme toward a discharge opening of said hopper, a spiral conveyor at said discharge opening, and a positive displacement pump receiving the creme from said spiral conveyor and discharging it into said depositor.

5. In a sandwiching machine of the character disclosed, a frame, means for conveying a pair of rows of cookies or the like along said frame, a depositor for depositing creme or the like on said cookies, said depositor comprising a depositor drum having a pair of discharge openings one for each row of cookies, removable stencils for said openings, means for rotating said drum cyclically in respect to the cookies supplied by said conveying means, a differential adjustment between said depositor drum and said conveyor means including sprockets and a chain, idlers for said chain, one of which is spring-controlled and the other of which is manually adjustable for shifting said chain relative to said conveying means and thereby changing the relative position of said conveying means and said depositor drum for centering the creme deposit on each cookie, combination shutoff and adjustable valve blocks in said depositor drum movable to shutoff and open positions for both of said discharge openings, and movable for adjusting the opening of one discharge opening relative to the other, means operable upon operation of the sandwiching machine to open said shutoff valve and close it when the machine stops operating, and a creme hopper and pump means for supplying creme to said depositor.

6. In a sandwiching machine, a frame, means for conveying two rows of cookies or the like along said frame, a depositor for depositing creme or the like on said cookies, said depositor comprising a depositor drum having two discharge openings, one for each row of cookies, means for rotating said drum cyclically in respect to the cookies supplied by said conveying means, combination shutoff and adjustable valve blocks in said depositor drum movable to shutoff and to open positions for both said discharge openings, and movable for adjusting the opening of one discharge opening relative to the other, and a creme hopper and pump means for supplying creme to said depositor.

7. A sandwiching machine comprising a frame, means for conveying two rows of cookies or the like along said frame, a depositor for depositing creme or the like on said cookies, said depositor comprising a depositor drum having a pair of discharge openings, one for each of said rows, means for rotating said drum cyclically in respect to the cookies supplied by said conveying means, and adjustable valve blocks in said depositor drum movable for adjusting the size of one of said discharge openings relative to the other.

8. A sandwiching machine comprising a frame, means for conveying two rows of cookies or the like along said frame, a depositor drum having two discharge openings, one for each of said rows, removable stencils for said openings, means for rotating said drum cyclically in respect to the cookies supplied by said conveying means, a differential adjustment between said depositor drum and said conveying means including sprockets and a chain, adjustable idlers for said chain for shifting the chain relative to said conveying means and thereby changing the relative position of said conveying means and said depositor drum, adjustable valve blocks in said depositor drum movable for adjusting the opening of one discharge opening relative to the other, a creme hopper and pump means for supplying creme to said depositor, said hopper having a paddle therein for urging the creme toward a discharge opening of said hopper, a spiral conveyor at said discharge opening, and a positive displacement pump receiving the creme from said spiral conveyor and discharging it into said depositor drum.

9. In a sandwiching machine of the character disclosed, a frame, means for conveying two rows of cookies or the like along said frame, a depositor for depositing creme or the like on said cookies, said depositor comprising a depositor drum having two discharge openings, one for each row, means for rotating said drum cyclically in respect to the cookies supplied by said conveying means, a differential adjustment between said depositor drum and said conveying means for centering the creme deposit on each cookie, combination shutoff and adjustable valve blocks in said depositor drum movable to shutoff and to open positions for both discharge openings, and relatively movable for adjusting the opening of one discharge opening to differ from that of the other, means operable upon operation of the sandwiching machine to open said shutoff valve, a creme hopper and pump means for supplying creme to said depositor, said hopper having a discharge opening, and a positive displacement pump receiving the creme from said discharge opening and supplying it to said depositor drum.

10. In a sandwiching machine of the character disclosed, a frame, means for conveying two rows of cookies or the like along said frame, a depositor for depositing creme or the like on said cookies, said depositor comprising a depositor drum having a discharge opening for each of said rows, means for rotating said drum cyclically in respect to the cookies supplied by said conveying means, a differential adjustment between said depositor drum and said conveying means including sprockets and a chain, idlers for said chain, one of which is manually adjustable for shifting said chain relative to said conveying means and thereby changing the relative position of said conveying means and said depositor drum, shutoff valve blocks in said depositor drum movable to shutoff and to open positions for both of said discharge openings, means operable upon operation of the sandwiching machine to open said shutoff valve and close it when the machine stops operating, a creme hopper for supplying creme to said depositor, and a positive displacement pump receiving the creme from said hopper and discharging it into said depositor drum.

11. In a sandwiching machine, a frame, means for conveying two rows of cookies or the like along said frame, a depositor for depositing creme or the like on said cookies, said depositor comprising a depositor drum having a discharge opening for each of said rows, means for rotating said drum cyclically in respect to the cookies supplied by said conveying means, a differential adjustment between said depositor drum and said conveying means for changing the relative position of said conveying means and said depositor drum, combination shutoff and adjustable valve blocks in said depositor drum movable to shutoff and open positions for both of said discharge openings, and movable for adjusting the degree that one of said discharge openings is opened relative to the other, means operable only upon operation of the sandwiching machine to automatically open said shutoff valve, a creme hopper for supplying creme to said depositor, said hopper having a paddle therein for urging the creme toward a discharge opening of said hopper, a spiral conveyor at said discharge opening, and a positive displacement pump receiving the creme from said spiral conveyor and discharging it into said depositor drum.

12. In a sandwiching machine of the character disclosed, a frame, means for conveying two rows of cookies or the like along said frame, a depositor for depositing creme or the like on said base cookies, said depositor comprising a depositor drum having two discharge openings, one for each row, removable stencils for said openings, means for rotating said drum cyclically in respect to the cookies supplied by said conveying means, a differential adjustment between said depositor drum and said conveying means including sprockets and a chain, idlers for said chain, one of which is spring-controlled and the other of which is manually adjustable for shifting said chain relative to said conveying means for centering the creme deposit on each cookie, adjustable valve blocks in said depositor drum movable for adjusting the opening of one of said discharge openings relative to the other, a creme hopper for supplying creme to said depositor, and a positive displacement pump receiving the creme from said hopper and discharging it into said depositor drum.

13. In a sandwiching machine of the character disclosed, a frame, means for conveying two rows of cookies or the like along said frame, a depositor for depositing creme or the like on said cookies, said depositor comprising a depositor drum having a discharge opening for each of said rows, removable stencils for said openings, means for rotating said drum cyclically in respect to the cookies supplied by said conveying means, a differential adjustment between said depositor drum and said conveying means including sprockets and a chain, idlers for said chain, one of which is manually adjustable for changing their relative positions to center the creme deposit on each cookie, combination shutoff and adjustable valve blocks in said depositor drum movable to shutoff and open positions for both of said discharge openings and relatively movable for opening one of said discharge openings to a greater extent than the other, means operable only upon operation of the sandwiching machine to open said shutoff valve, a creme hopper for supplying creme to said depositor, and a positive displacement pump receiving creme from said hopper and discharging it into said depositor drum.

14. In a sandwiching machine, a frame, means for conveying two rows of cookies or the like along said frame, a depositor for depositing creme or the like on said cookies, said depositor comprising a depositor drum having a discharge opening for each of said rows, removable stencils for said openings, means for rotating said drum cyclically in respect to the cookies supplied by said conveying means, a differential adjustment between said depositor drum and said conveying means including sprockets and a chain, idlers for said chain, one of which is manually adjustable for shifting said chain relative to said conveying means and thereby changing the relative position of said conveying means and said depositor drum, combination shutoff and adjustable valve blocks in said depositor drum movable to shutoff and open positions for both of said discharge openings and further movable for adjusting the opening of one discharge opening relative to the other, means operable upon operation of the sandwiching machine to open said shutoff valve, a creme hopper for supplying creme to said depositor, said hopper having a paddle therein for urging the creme toward a discharge opening of said hopper, a spiral conveyor at said discharge opening, and a positive displacement pump receiving the creme from said spiral conveyor and discharging it into said depositor drum.

15. In a sandwiching machine of the character disclosed, a frame, means for conveying two rows of cookies or the like along said frame, a depositor for depositing creme or the like on said cookies, said depositor comprising a depositor drum having a discharge opening for each of said rows, means for rotating said drum cyclically in respect to the cookies supplied by said conveying means, a differential adjustment between said depositor drum and said conveying means including sprockets and a chain, idlers for said chain, one of which is spring-controlled and the other of which is manually adjustable for shifting said chain relative to said conveying means and thereby changing their relative positions for creme deposit centering purposes, adjustable valve blocks in said depositor drum movable for adjusting the opening of one of said discharge openings relative to the other, a creme hopper for supplying creme to said depositor, and a positive displacement pump receiving creme from said hopper and discharging it into said depositor drum.

16. A sandwiching machine comprising a frame, means for conveying two rows of cookies or the like along said frame, a depositor for depositing creme or the like on said cookies, said depositor comprising a depositor drum having a discharge opening for each of said rows, means for rotating said drum cyclically in respect to the cookies supplied by said conveying means, a differential adjustment between said depositor drum and said conveying means for centering the creme deposit on each cookie, combination shutoff and adjustable valve blocks in said depositor drum movable to shutoff and open positions for both of said discharge openings and relatively movable for adjusting the opening of one discharge relative to the other, means automatically operable only upon operation of the sandwiching machine to open said shutoff valve, a creme hopper for supplying creme to said depositor, and a positive displacement pump receiving the creme from said hopper and discharging it into said depositor drum.

References Cited in the file of this patent

UNITED STATES PATENTS

| | | |
|---|---|---|
| 820,388 | Carter | May 15, 1906 |
| 1,348,269 | Costigan | Aug. 3, 1920 |
| 1,501,285 | Lawrence | July 15, 1924 |
| 1,582,820 | Hungerford | Apr. 27, 1926 |
| 1,696,845 | Hislop | Dec. 25, 1928 |
| 1,875,601 | Helland | Sept. 6, 1932 |
| 1,904,742 | MacFarlane et al. | Apr. 18, 1933 |
| 2,348,400 | Manspeaker | May 9, 1944 |
| 2,394,795 | Manspeaker | Feb. 12, 1946 |
| 2,525,986 | White | Oct. 17, 1950 |
| 2,603,341 | Knee | July 15, 1952 |
| 2,722,900 | Knee | Nov. 8, 1955 |
| 2,846,960 | Govatsos | Aug. 12, 1958 |
| 2,868,141 | Griner | Jan. 13, 1959 |
| 2,868,241 | Guckel | Jan. 13, 1959 |
| 2,934,101 | Guckel | Apr. 26, 1960 |

FOREIGN PATENTS

| | | |
|---|---|---|
| 736,249 | Great Britain | Sept. 7, 1955 |